United States Patent
Chen et al.

(10) Patent No.: US 12,273,827 B2
(45) Date of Patent: Apr. 8, 2025

(54) ENHANCED PHR REPORTING IN SUPPORT OF UE ANTENNA SCALING

(71) Applicant: APPLE INC., Cupertino, CA (US)

(72) Inventors: Xiang Chen, Campbell, CA (US); Anatoliy S Ioffe, Cupertino, CA (US); Dawei Zhang, Saratoga, CA (US); Fucheng Wang, Cupertino, CA (US); Huaning Niu, San Jose, CA (US); Jie Cui, San Jose, CA (US); Manasa Raghavan, Sunnyvale, CA (US); Qiming Li, Beijing (CN); Yang Tang, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/904,808

(22) PCT Filed: Sep. 24, 2021

(86) PCT No.: PCT/CN2021/120256
§ 371 (c)(1),
(2) Date: Aug. 23, 2022

(87) PCT Pub. No.: WO2023/044734
PCT Pub. Date: Mar. 30, 2023

(65) Prior Publication Data
US 2024/0236872 A1    Jul. 11, 2024

(51) Int. Cl.
*H04B 7/00* (2006.01)
*H04W 52/24* (2009.01)
*H04W 52/36* (2009.01)

(52) U.S. Cl.
CPC ....... *H04W 52/365* (2013.01); *H04W 52/242* (2013.01)

(58) Field of Classification Search
CPC ............. H04W 52/365; H04W 52/242; H04W 52/352; H04W 52/367; H04B 7/02; H04B 7/0413; H04B 7/0452
See application file for complete search history.

(56) References Cited

U.S. PATENT DOCUMENTS 8,325,089 B2 *  12/2012  Rofougaran ............. H01Q 3/26
                                                    342/372
10,014,916 B2 *  7/2018  Yuan .................... H04B 17/373
(Continued)

FOREIGN PATENT DOCUMENTS

WO    2020168296 A1    8/2020

OTHER PUBLICATIONS

Apple , "Motivation to study UE antenna scaling enhancement in FR2-1 and FR2-2 in Rel-18", RP-212306, 3GPP TSG-RAN Meeting #93-e, Electronic Meeting, Sep. 13-17, 2021, 6 pages.
(Continued)

*Primary Examiner* — Tuan Pham
(74) *Attorney, Agent, or Firm* — Dorsey & Whitney LLP

(57) ABSTRACT

The present disclosure relates to devices, apparatuses, and methods for enhanced PHR reporting in support of UE antenna scaling. A wireless device, which comprises at least one antenna array each comprising a plurality of antenna elements may perform antenna scaling by activating or deactivating at least one of the plurality of antenna elements (with corresponding RF chains) of one or more antenna arrays. The wireless device may generate a power headroom (PHR) report based at least on a difference between beamforming gains obtained after the antenna scaling and before the antenna scaling. The wireless device may then send the PHR report to a base station in communication with the wireless device.

20 Claims, 6 Drawing Sheets

(56) References Cited

U.S. PATENT DOCUMENTS

2012/0134441 A1     5/2012   Yokomakura et al.
2021/0249768 A1     8/2021   Ioffe et al.
2022/0158717 A1*   5/2022   Frenger ................ H04B 7/0695

OTHER PUBLICATIONS

PCT/CN2021/120256, International Search Report and Written Opinion, Jun. 23, 2022, 9 pages.

* cited by examiner

ENHANCED PHR REPORTING IN SUPPORT OF UE ANTENNA SCALING

TECHNICAL FIELD

This application relates generally to wireless communication systems, including devices, apparatuses, and methods for enhanced PHR reporting in support of UE antenna scaling.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

Frequency bands for 5G NR may be separated into two or more different frequency ranges. For example, Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mm Wave) range of FR2 may have smaller coverage but potentially higher available bandwidth than bands in the FR1. Skilled persons will recognize these frequency ranges, which are provided by way of example, may change from time to time or from region to region.

SUMMARY

Embodiments relate to devices, apparatuses, and methods for enhanced PHR reporting in support of UE antenna scaling.

According to the techniques described herein, a wireless device operating in NR FR2 may perform antenna scaling by activating/deactivating at least one of a plurality of antenna elements (with corresponding RF chains) of one or more antenna arrays of the wireless device to reduce power consumption. The wireless device may generate a power headroom (PHR) report based at least on a difference between beamforming gains obtained after the antenna scaling and before the antenna scaling. Then, the wireless device may send the PHR report to a base station in communication with the wireless device.

Thus, the techniques described herein may be used to provide enhanced PHR reporting in support of UE antenna scaling and improve system performance, at least according to some embodiments.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

Figure 1:
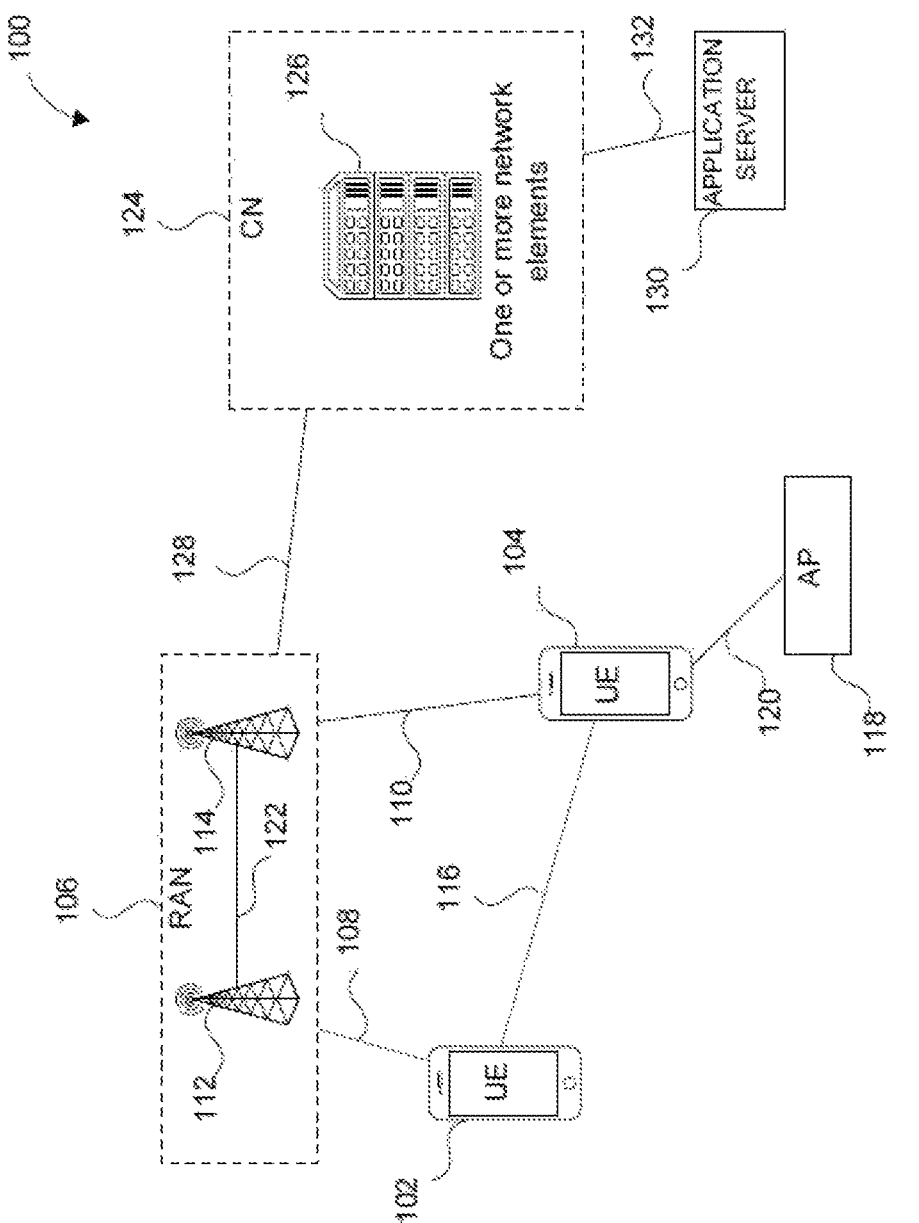
FIG. 1 illustrates an example architecture of a wireless communication system, according to embodiments disclosed herein.

FIG. 1 illustrates an example architecture of a wireless communication system 100, according to embodiments disclosed herein. The following description is provided for an example wireless communication system 100 that operates in conjunction with the LTE system standards and/or 5G or NR system standards as provided by 3GPP technical specifications.

As shown by FIG. 1, the wireless communication system 100 includes UE 102 and UE 104 (although any number of UEs may be used). In this example, the UE 102 and the UE 104 are illustrated as smartphones (e.g., handheld touchscreen mobile computing devices connectable to one or more cellular networks), but may also comprise any mobile or non-mobile computing device configured for wireless communication.

The UE 102 and UE 104 may be configured to communicatively couple with a RAN 106. In embodiments, the RAN 106 may be NG-RAN, E-UTRAN, etc. The UE 102 and UE 104 utilize connections (or channels) (shown as connection 108 and connection 110, respectively) with the RAN 106, each of which comprises a physical communications interface. The RAN 106 can include one or more base stations, such as base station 112 and base station 114, that enable the connection 108 and connection 110.

In this example, the connection 108 and connection 110 are air interfaces to enable such communicative coupling, and may be consistent with RAT(s) used by the RAN 106, such as, for example, an LTE and/or NR.

In some embodiments, the UE 102 and UE 104 may also directly exchange communication data via a sidelink interface 116. The UE 104 is shown to be configured to access an access point (shown as AP 118) via connection 120. By way of example, the connection 120 can comprise a local wireless connection, such as a connection consistent with any IEEE 802.11 protocol, wherein the AP 118 may comprise a Wi-Fi® router. In this example, the AP 118 may be connected to another network (for example, the Internet) without going through a CN 124.

In embodiments, the UE 102 and UE 104 can be configured to communicate using orthogonal frequency division multiplexing (OFDM) communication signals with each other or with the base station 112 and/or the base station 114 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 112 or base station 114 may be implemented as one or more software entities running on server computers as part of a virtual network. In addition, or in other embodiments, the base station 112 or base station 114 may be configured to communicate with one another via interface 122. In embodiments where the wireless communication system 100 is an LTE system (e.g., when the CN 124 is an EPC), the interface 122 may be an X2 interface. The X2 interface may be defined between two or more base stations (e.g., two or more eNBs and the like) that connect to an EPC, and/or between two eNBs connecting to the EPC. In embodiments where the wireless communication system 100 is an NR system (e.g., when CN 124 is a 5GC), the interface 122 may be an Xn interface. The Xn interface is defined between two or more base stations (e.g., two or more gNBs and the like) that connect to 5GC, between a base station 112 (e.g., a gNB) connecting to 5GC and an eNB, and/or between two eNBs connecting to 5GC (e.g., CN 124).

The RAN 106 is shown to be communicatively coupled to the CN 124. The CN 124 may comprise one or more network elements 126, which are configured to offer various data and telecommunications services to customers/subscribers (e.g., users of UE 102 and UE 104) who are connected to the CN 124 via the RAN 106. The components of the CN 124 may be implemented in one physical device or separate physical devices including components to read and execute instructions from a machine-readable or computer-readable medium (e.g., a non-transitory machine-readable storage medium).

In embodiments, the CN 124 may be an EPC, and the RAN 106 may be connected with the CN 124 via an S1 interface 128. In embodiments, the S1 interface 128 may be split into two parts, an S1 user plane (S1-U) interface, which carries traffic data between the base station 112 or base station 114 and a serving gateway (S-GW), and the S1-MME interface, which is a signaling interface between the base station 112 or base station 114 and mobility management entities (MMEs).

In embodiments, the CN 124 may be a 5GC, and the RAN 106 may be connected with the CN 124 via an NG interface 128. In embodiments, the NG interface 128 may be split into two parts, an NG user plane (NG-U) interface, which carries traffic data between the base station 112 or base station 114 and a user plane function (UPF), and the S1 control plane (NG-C) interface, which is a signaling interface between the base station 112 or base station 114 and access and mobility management functions (AMFs).

Generally, an application server 130 may be an element offering applications that use internet protocol (IP) bearer resources with the CN 124 (e.g., packet switched data services). The application server 130 can also be configured to support one or more communication services (e.g., VoIP sessions, group communication sessions, etc.) for the UE 102 and UE 104 via the CN 124. The application server 130 may communicate with the CN 124 through an IP communications interface 132.

Figure 2:
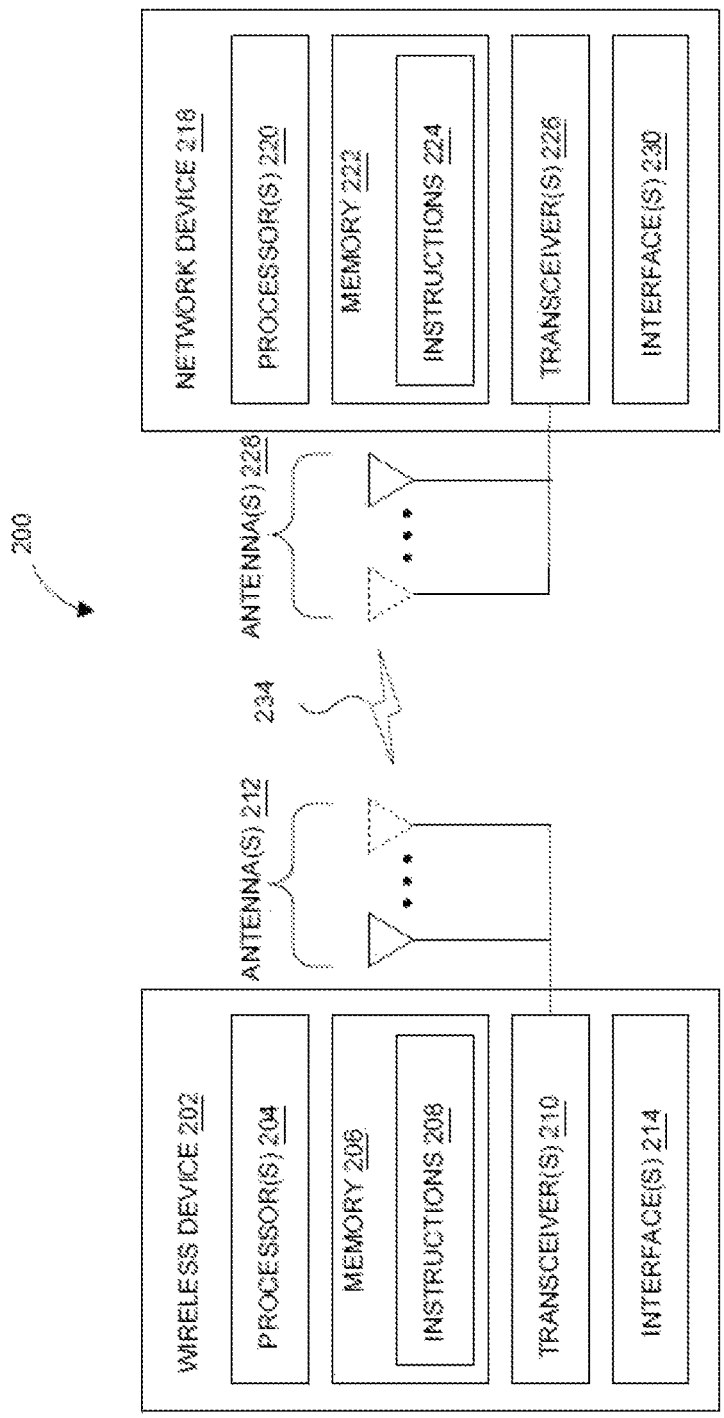
FIG. 2 illustrates a system for performing signaling between a wireless device and a network device, according to embodiments disclosed herein.

FIG. 2 illustrates a system 200 for performing signaling 234 between a wireless device 202 and a network device 218, according to embodiments disclosed herein. The system 200 may be a portion of a wireless communications system as herein described. The wireless device 202 may be, for example, a UE of a wireless communication system. The network device 218 may be, for example, a base station (e.g., an eNB or a gNB) of a wireless communication system.

The wireless device 202 may include one or more processor(s) 204. The processor(s) 204 may execute instructions such that various operations of the wireless device 202 are performed, as described herein. The processor(s) 204 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 202 may include a memory 206. The memory 206 may be a non-transitory computer-readable storage medium that stores instructions 208 (which may include, for example, the instructions being executed by the processor(s) 204). The instructions 208 may also be referred to as program code or a computer program. The memory 206 may also store data used by, and results computed by, the processor(s) 204.

The wireless device 202 may include one or more transceiver(s) 210 that may include radio frequency (RF) transmitter and/or receiver circuitry that use the antenna(s) 212 of the wireless device 202 to facilitate signaling (e.g., the signaling 234) to and/or from the wireless device 202 with other devices (e.g., the network device 218) according to corresponding RATs.

The wireless device 202 may include one or more antenna(s) 212 (e.g., one, two, four, or more). For embodiments with multiple antenna(s) 212, the wireless device 202 may leverage the spatial diversity of such multiple antenna(s) 212 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 202 may be accomplished according to precoding (or digital beamforming) that is applied at the wireless device 202 that multiplexes the data streams across the antenna(s) 212 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 202 may implement analog beamforming techniques, whereby phases of the signals sent by the antenna(s) 212 are relatively adjusted such that the (joint) transmission of the antenna(s) 212 can be directed (this is sometimes referred to as beam steering).

The wireless device 202 may include one or more interface(s) 214. The interface(s) 214 may be used to provide input to or output from the wireless device 202. For example, a wireless device 202 that is a UE may include interface(s) 214 such as microphones, speakers, a touchscreen, buttons, and the like in order to allow for input and/or output to the UE by a user of the UE. Other interfaces of such a UE may be made up of made up of transmitters, receivers, and other circuitry (e.g., other than the transceiver(s) 210/antenna(s) 212 already described) that allow for communication between the UE and other devices and may operate according to known protocols (e.g., Wi-Fi®, Bluetooth®, and the like).

The network device 218 may include one or more processor(s) 220. The processor(s) 220 may execute instructions such that various operations of the network device 218 are performed, as described herein. The processor(s) 204 may include one or more baseband processors implemented using, for example, a CPU, a DSP, an ASIC, a controller, an FPGA device, another hardware device, a firmware device, or any combination thereof configured to perform the operations described herein.

The network device 218 may include a memory 222. The memory 222 may be a non-transitory computer-readable storage medium that stores instructions 224 (which may include, for example, the instructions being executed by the processor(s) 220). The instructions 224 may also be referred to as program code or a computer program. The memory 222 may also store data used by, and results computed by, the processor(s) 220.

The network device 218 may include one or more transceiver(s) 226 that may include RF transmitter and/or receiver circuitry that use the antenna(s) 228 of the network device 218 to facilitate signaling (e.g., the signaling 234) to and/or from the network device 218 with other devices (e.g., the wireless device 202) according to corresponding RATs.

The network device 218 may include one or more antenna(s) 228 (e.g., one, two, four, or more). In embodiments having multiple antenna(s) 228, the network device 218 may perform MIMO, digital beamforming, analog beamforming, beam steering, etc., as has been described.

The network device 218 may include one or more interface(s) 230. The interface(s) 230 may be used to provide input to or output from the network device 218. For example, a network device 218 that is a base station may include interface(s) 230 made up of transmitters, receivers, and other circuitry (e.g., other than the transceiver(s) 226/antenna(s) 228 already described) that enables the base station to communicate with other equipment in a core network, and/or that enables the base station to communicate with external networks, computers, databases, and the like for purposes of operations, administration, and maintenance of the base station or other equipment operably connected thereto.

A UE configured to operate under NR FR2 may generally be equipped with multiple antenna arrays, and each antenna array may comprise a plurality of antenna elements that may be spatially arranged and electrically interconnected to produce a directional radiation pattern. The antenna elements may be used to perform beamforming to compensate for large pathloss in FR2. In order to save power, the UE may deactivate (e.g., power off) some of its antenna elements (and also deactivate the corresponding Tx/Rx (Transmit/Receive) chains driving the antenna elements) when, for example, one of the following events occurs: when the pathloss between the UE and the base station is relatively small (e.g., when UE is at cell center), or when the UE does not have much uplink (UL) traffic to transmit. Accordingly, the UE may need to activate (e.g., power on) more antenna elements (and also deactivate the corresponding Tx/Rx (Transmit/Receive) chains driving the antenna elements) when, for example, one of the following events occurs: when the pathloss of between the UE and the base station becomes relatively large (e.g., when the UE moves to cell edge), or when the UE has much UL traffic to transmit. Thus, the UE can perform antenna scaling by activating or deactivating at least one of the plurality of antenna elements of one or more antennas of at least one antenna of the UE.

When a UE scales its antenna elements in the UL, it may be beneficial to inform the network of the antenna scaling, e.g., via Power Headroom (PHR) reporting, in a timely manner. If the network does not receive information on the antenna scaling in time, the network would rely on previous PHR report before receiving the updated PHR report from the UE and there may be an information mismatch between the base station and the UE, which may lead to performance degradation. For example, when a UE scales down its antenna elements and the base station does not receive any information regarding the scaling, the base station may still assume the UE can transmit at a higher power and thus schedule higher Modulation and Coding Scheme (MCS) and large Resource Block (RB) allocation for the next Physical Uplink Shared Channel (PUSCH) transmission of the UE, and the PUSCH transmission may fail, e.g., due to low Signal to Noise Ratio (SNR). As another example, when a UE scales up and the base station does not receive any information regarding the scaling, the base station may not schedule high enough MCS or large enough RB allocation for the next PUSCH transmission of the UE, and thus the transmit power of the UE is underutilized and the throughput is lower than it should be.

In current NR PHR reporting, the information element PHR-Config is used to configure parameters for PHR reporting, and PHR reporting will only be triggered when certain conditions are met, such as when a periodic timer, called phr-Periodic Timer, expires, or when a prohibit timer for prohibiting PHR reporting, called phr-ProhibitTimer, expires or has expired and the path loss has changed more than phr-Tx-PowerFactorChange dB since the last transmission of a PHR. Phr-PeriodicTimer, phr-ProhibitTimer, and phr-Tx-PowerFactorChange are configurable parameters in the information element PHR-Config. The phr-Periodic-Timer can be configured with values between 10 ms and infinity, and the phr-ProhibitTimer can be configured with values between 0 and 1000 ms. The information element PHR-Config in 3GPP TS 38.331 V16.5.0, "Radio Resource Control (RRC) protocol specification (Release 16)", is shown as follows:

```
PHR-Config ::=              SEQUENCE {
    phr-PeriodicTimer       ENUMERATED {sf10, sf20, sf50, sf100, sf200, sf500, sf1000, infinity},
    phr-ProhibitTimer       ENUMERATED {sf0, sf10, sf20, sf50, sf100,sf200, sf500, sf1000},
    phr-Tx-PowerFactorChange  ENUMERATED {dB1, dB3, dB6, infinity},
    multiplePHR             BOOLEAN,
    dummy                   BOOLEAN,
    phr-Type2OtherCell      BOOLEAN,
    phr-ModeOtherCG         ENUMERATED {real, virtual},
    ...,
    [[
    mpe-Reporting-FR2-r16   SetupRelease { MPE-Config-FR2-r16 }  OPTIONAL   -- NEED M
    ]]
}
```

In the current PHR reporting scheme, depending on the chosen values of these two timers, there may be a significant delay in informing the base station, and hence performance may get degraded. In addition, under such reporting scheme, PHR reporting may not be triggered for certain antenna scaling scenarios, e.g., a UE scales down its antenna elements due to not having much UL traffic to transmit, but the pathloss between the base station and the UE has not changed substantially since there is no significant change in the location of the UE. Thus, devices, apparatuses, and methods for enhanced PHR reporting in support of UE antenna scaling are required.

Figure 3:
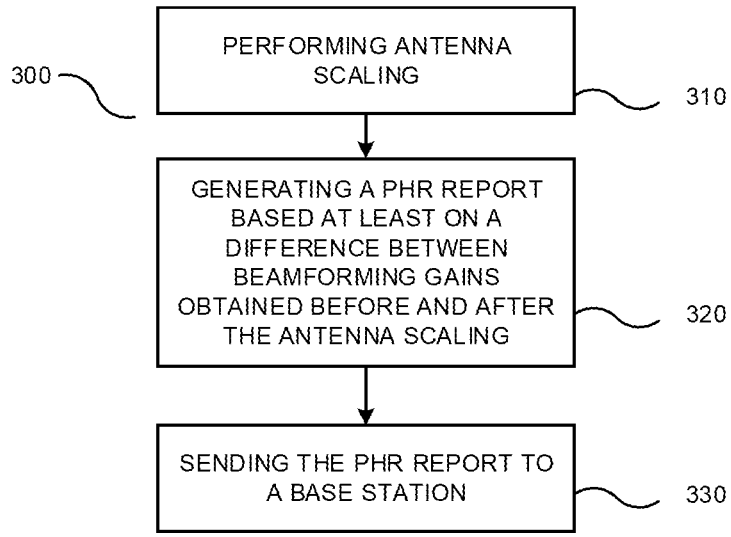
FIG. 3 is a flowchart diagram illustrating an example method for enhanced PHR reporting in support of UE antenna scaling, according to some embodiments disclosed herein.

With reference now to FIG. 3, FIG. 3 is a flowchart diagram illustrating an example method 300 for enhanced PHR reporting in support of UE antenna scaling, according to some embodiments disclosed herein. The example method 300 may be implemented, for example, by a wireless device, such as the wireless device 202 in FIG. 2 or the UE 102 and UE 104 in FIG. 1. In various embodiments, some of the elements of the methods shown may be performed concurrently, in a different order than shown, may be substituted for by other method elements, or may be omitted. Additional elements may also be performed as desired. As shown, the method of FIG. 3 may operate as follows.

As shown at 310, the method 300 may include performing antenna scaling. The wireless device may comprise at least one antenna array each comprising a plurality of antenna elements, and the antenna scaling may be performed by activating or deactivating at least one of the plurality of antenna elements of one or more antenna arrays of the wireless device. As discussed above, the wireless device may scale up or down its antenna elements due to various reasons, which are not limited herein. The wireless device may derive a beamforming gain before the antenna scaling and a beamforming gain after the antenna scaling based on its configurations for the antenna elements (such as patterns, orientations, and polarizations of the antenna elements).

As shown at 320, the method 300 may include generating a PHR report based at least on a difference between beamforming gains obtained after the antenna scaling and before the antenna scaling. The PHR report may indicate a PHR value that represents a difference between the maximum UE transmit power and the calculated UE transmit power. For example, the PHR may be encoded in 6 bits with a reporting range from −23 dB to +40 dB in steps of 1 dB. In some embodiments, the power headroom may be given by the following equation as an example:

$$\text{Power Headroom} = \qquad (1)$$
$$P_{CMAX} - \{P_{O,PUSCH} + 10\log_{10}(2^\mu \cdot M) + \alpha \cdot PL + \Delta + f\}$$

The maximum per-carrier transmit power for carrier c is denoted as $P_{CMAX}$, $P_{O,PUSCH}$ represents the PUSCH power that the base station expects to receive, PL represents path loss in the downlink, $\alpha$ is a compensation factor for the path loss, $\mu$ is subcarrier spacing configuration, M is the bandwidth of the PUSCH resource assignment expressed in number of resource blocks, $\Delta$ captures the required adjustment based on MCS, and f is the PUSCH power control adjustment state. It should be noted that the PHR value may be calculated in any appropriate way, which is not limited herein. According to some embodiments, the PHR value may be generated by taking measured path loss subtracted by the difference between beamforming gains obtained after the antenna scaling and before the antenna scaling as current path loss. For example, in the above equation (1), PL is replaced with PL−$G_{diff}$, and $G_{diff}$ represents the difference between beamforming gains obtained after the antenna scaling and before the antenna scaling. For example, if the beamforming gain after the antenna scaling is 3 dB greater than the beamforming gain before the antenna scaling, the estimated path loss will be reduced by 3 dB. In this way, the updated path loss may effectively reflect the beamforming gain difference.

According to some embodiments, as long as antenna scaling is performed, the wireless device may generate the PHR report directly, no matter whether triggering conditions of PHR reporting are met (e.g., whether a phr-PeriodicTimer expires, or whether phr-ProhibitTimer expires or has expired and the path loss has changed more than phr-Tx-PowerFactorChange dB since the last transmission of a PHR). According to some embodiments, the method 300 may further comprise determining whether a triggering condition of PHR reporting is met, and the PHR report is generated in response to determining that the triggering condition of PHR reporting is met. By employing appropriate triggering conditions of PHR reporting, a tradeoff between network performance and communication overhead may be achieved.

According to some embodiments, determining whether the triggering condition of PHR reporting is met may further comprise: determining whether the difference between beamforming gains obtained after the antenna scaling and before the antenna scaling exceeds a threshold. For example, the threshold may include a phr-Tx-PowerFactorChange parameter as discussed above, or any other pre-defined threshold that is predetermined (e.g., hard coded in a specification) or configured by a base station through signaling (e.g., through an information element). The PHR report due to antenna scaling may be generated in response to determining that the difference between beamforming gains obtained after the antenna scaling and before the antenna scaling exceeds the threshold. In some embodiments, in response to determining that the difference between beamforming gains obtained after the antenna scaling and before the antenna scaling does not exceed the threshold, PHR reporting may follow conventional rules, e.g., PHR report may still be generated if phr-PeriodicTimer expires, or if phr-ProhibitTimer expires or has expired and the path loss has changed more than phr-Tx-PowerFactorChange dB since the last transmission of a PHR. In some embodiments, in response to determining that the difference between beamforming gains obtained after the antenna scaling and before the antenna scaling does not exceed the threshold, the PHR report may not be generated. In this way, antenna scaling that may affect the UL transmission to a certain extent will be notified to the base station, while antenna scaling that has little or small impact on the UL transmission will not be notified to the base station.

According to some embodiments, determining whether the triggering condition of PHR reporting is met may further comprise: determining whether the difference between beamforming gains obtained after the antenna scaling and before the antenna scaling exceeds a first threshold; and determining whether the difference between beamforming gains obtained after the antenna scaling and before the antenna scaling exceeds a second threshold such as phr-Tx-PowerFactorChange, in response to determining that the difference between beamforming gains obtained after the antenna scaling and before the antenna scaling exceeds the first threshold. The PHR report may be generated in response to determining that the difference between beamforming gains obtained after the antenna scaling and before the antenna scaling exceeds the second threshold. According to some embodiments, the first threshold may be predetermined (e.g., hard coded in a specification) or configured by a base station (e.g., through an information element). According to some embodiments, the second threshold is a phr-Tx-PowerFactorChange parameter. In some embodiments, the first threshold is smaller than the second threshold. For example, the first threshold may be 3 dB and the second threshold may be 6 dB. The dual threshold method may provide more flexibility in managing the PHR reporting.

According to some embodiments, determining whether the triggering condition of PHR reporting is met may further comprise: determining whether the difference between beamforming gains obtained after the antenna scaling and before the antenna scaling exceeds a threshold and a prohibit timer for prohibiting PHR reporting (e.g., phr-ProhibitTimer) expires or has expired. The PHR report may be generated in response to determining that the difference between beamforming gains obtained after the antenna scaling and before the antenna scaling exceeds the threshold and the prohibit timer for prohibiting PHR reporting (e.g., phr-ProhibitTimer) expires or has expired. For example, the threshold may include a phr-Tx-PowerFactorChange parameter as discussed above. In some embodiments, the PHR report may not be generated in response to determining that the difference between beamforming gains obtained after the antenna scaling and before the antenna scaling does not exceed the threshold or the prohibit timer for prohibiting PHR reporting (e.g., phr-ProhibitTimer) has not expired yet.

According to some embodiments, the method 300 further comprises receiving a message indicating whether enhanced PHR reporting is enabled from the base station. For example, the message may be received before step 320 or before step 310. When the message indicates that the enhanced PHR reporting is enabled, the wireless device may implement the method for enhanced PHR reporting according to embodiments of the disclosure (e.g., the method shown in FIGS. 3-7) and the PHR report may be generated directly or in response to determining that the triggering condition of PHR reporting is met after antenna scaling. However, when the message indicates that the enhanced PHR reporting is disabled, the wireless device may not implement the method for enhanced PHR reporting according to embodiments of the disclosure and follow conventional rules for PHR reporting, e.g., PHR report may be generated if phr-Periodic Timer expires, or if phr-ProhibitTimer expires or has expired and the path loss has changed more than phr-Tx-PowerFactorChange dB since the last transmission of a PHR. The message may be broadcast to all wireless devices in a cell of a base station, or may be sent to each wireless device separately. By sending the message indicating whether enhanced PHR reporting is enabled, the base station may be able to enable or disable the enhanced PHR reporting as needed.

As shown at 330, the method 300 may include sending the PHR report to a base station in communication with the wireless device. The base station may schedule MCS and RB allocation based on the PHR report received from the wireless device. In some embodiments, the wireless device may restart phr-ProhibitTimer and/or phr-PeriodicTimer after sending the PHR report.

Figure 4:
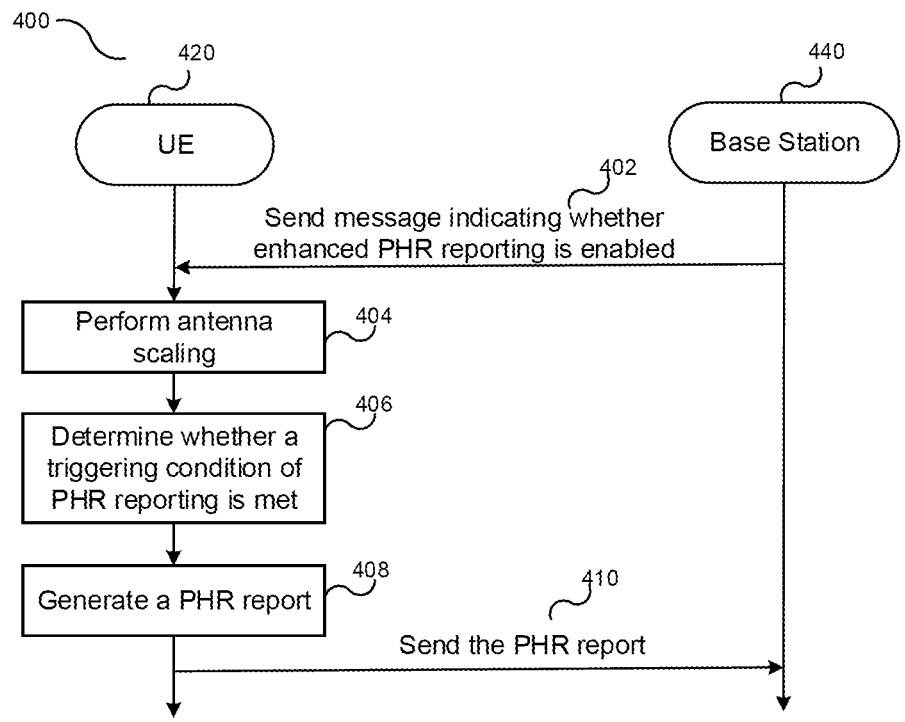
FIG. 4 is a flowchart diagram illustrating an example method for enhanced PHR reporting in support of UE antenna scaling, according to some embodiments disclosed herein.

With reference now to FIG. 4, FIG. 4 is a flowchart diagram illustrating an example method 400 for enhanced PHR reporting in support of UE antenna scaling, according to some embodiments disclosed herein. A UE 420, such as the wireless device 202 that is a UE in FIG. 2 or the UE 102 and UE 104 in FIG. 1, and a base station 440, such as the network device 218 that is a base station in FIG. 2 or the base station 112 and the base station 114 in FIG. 1, are involved in the example method 400. In various embodiments, some of the elements of the methods shown may be performed concurrently, in a different order than shown, may be substituted for by other method elements, or may be omitted. Additional elements may also be performed as desired. As shown, the method of FIG. 4 may operate as follows.

At 402, the base station 440 may send a message indicating whether enhanced PHR reporting is enabled to the UE 420. It should be noted that step 402 is optional, and the base station 440 may not send such message in some embodiments. According to some embodiments, the enhanced PHR reporting by the UE 420 is always enabled.

At 404, the UE 420 may perform antenna scaling by activating or deactivating at least one of the plurality of antenna elements of one or more antennas of at least one antenna of the UE 420.

At 406, the UE 420 may determine whether the triggering condition of PHR reporting is met. According to some embodiments, determining whether the triggering condition of PHR reporting is met may include, for example, determining whether the difference between beamforming gains obtained after the antenna scaling and before the antenna scaling exceeds a threshold, or determining whether the difference between beamforming gains obtained after the antenna scaling and before the antenna scaling exceeds a threshold and a prohibit timer for prohibiting PHR reporting expires or has expired. According to some embodiments, determining whether the triggering condition of PHR reporting is met may further comprise: determining whether the difference between beamforming gains obtained after the antenna scaling and before the antenna scaling exceeds a first threshold; and determining whether the difference between beamforming gains obtained after the antenna scaling and before the antenna scaling exceeds a second threshold, in response to determining that the difference between beamforming gains obtained after the antenna scaling and before the antenna scaling exceeds the first threshold. The triggering condition of PHR reporting has been described above with respect to FIG. 3, and the description thereof will not be repeated here for simplicity. It should be noted that step 406 is optional, and the UE 420 may not determine whether the triggering condition of PHR reporting is met and instead generate and send a PHR report immediately after antenna scaling, in some embodiments.

At 408, the UE 420 may generate a PHR report, in response to determining that the triggering condition of PHR reporting is met and when the message received from the base station 440 (if available) indicates that the enhanced PHR reporting is enabled. The generation of a PHR report has been described above with respect to FIG. 3, and the description thereof will not be repeated here for simplicity.

At 410, the UE 420 may send the PHR report to the base station 440.

Figure 5:
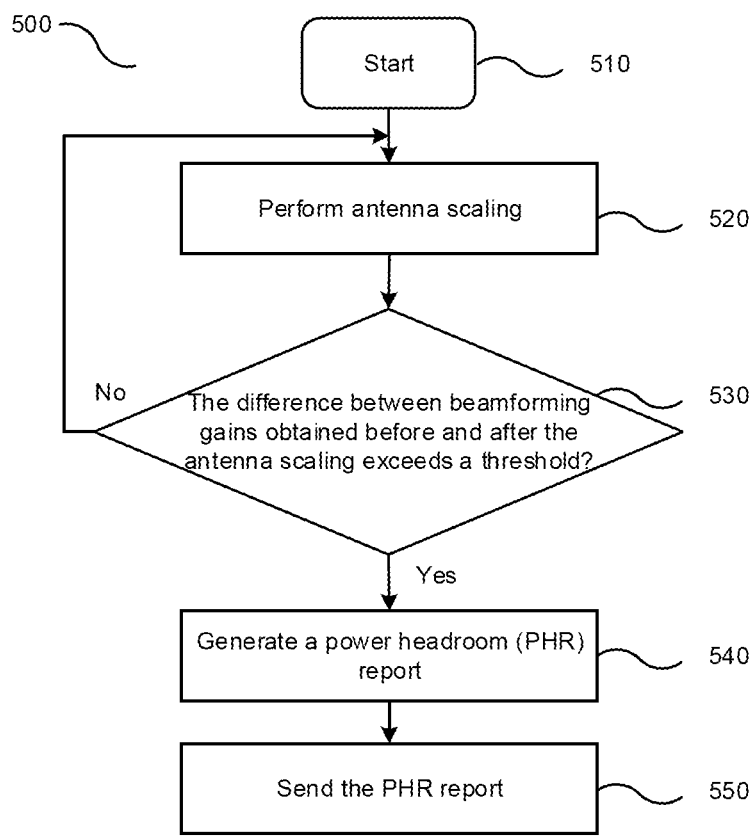
FIGS. 5-7 are flowchart diagrams illustrating example methods for enhanced PHR reporting in support of UE antenna scaling, according to some embodiments disclosed herein.

FIG. 5 is a flowchart diagram illustrating an example method 500 for enhanced PHR reporting in support of UE antenna scaling, according to some embodiments disclosed herein. The example method 500 may be implemented, for example, by a wireless device, such as the wireless device 202 in FIG. 2 or the UE 102 and UE 104 in FIG. 1. In various embodiments, some of the elements of the methods shown may be performed concurrently, in a different order than shown, may be substituted for by other method elements, or may be omitted. Additional elements may also be performed as desired. As shown, the method of FIG. 5 may operate as follows.

The method 500 may start at 510.

As shown at 520, the method 500 may include performing antenna scaling by activating or deactivating at least one of the plurality of antenna elements of one or more antenna arrays of the wireless device.

As shown at 530, the method 500 may include determining whether the difference between beamforming gains obtained after the antenna scaling and before the antenna scaling exceeds a threshold. For example, the threshold may include a phr-Tx-PowerFactorChange parameter as discussed above, or any other pre-defined threshold that is predetermined (e.g., hard coded in a specification) or configured by a base station (e.g., through an information element). If yes, the method 500 may proceed to 540, where a PHR report may be generated. Then at 550, the PHR report may be sent to a base station in communication with the wireless device.

If it is determined that the difference between beamforming gains obtained after the antenna scaling and before the antenna scaling does not exceed the threshold at 530, the method 500 may return to the beginning and wait for the next antenna scaling, for example.

According to some embodiments, the method 500 may further comprise receiving a message indicating whether enhanced PHR reporting is enabled from the base station. Such message may be received at any time, e.g., before step 520 or between steps 520 and 530. The PHR report may be generated at 540 further in response to the message indicating that the enhanced PHR reporting is enabled.

Figure 6:
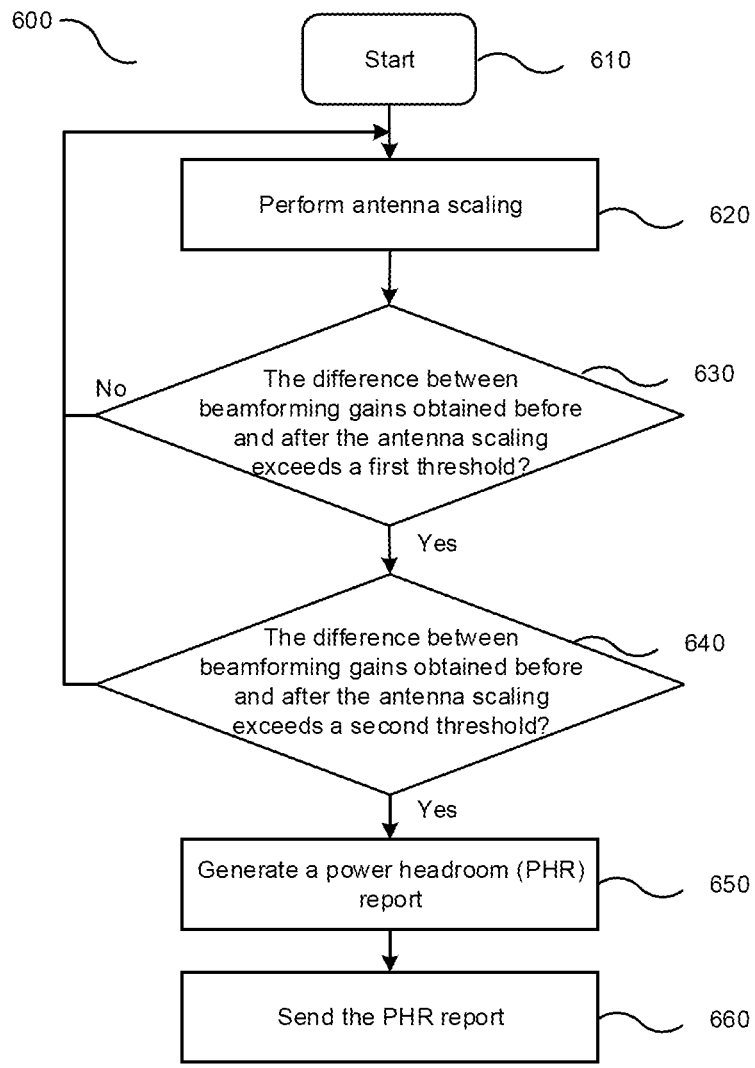

FIG. 6 is a flowchart diagram illustrating an example method 600 for enhanced PHR reporting in support of UE antenna scaling, according to some embodiments disclosed herein. The example method 600 may be implemented, for example, by a wireless device, such as the wireless device 202 in FIG. 2 or the UE 102 and UE 104 in FIG. 1. In various embodiments, some of the elements of the methods shown may be performed concurrently, in a different order than shown, may be substituted for by other method elements, or may be omitted. Additional elements may also be performed as desired. As shown, the method of FIG. 6 may operate as follows.

The method 600 may start at 610.

As shown at 620, the method 600 may include performing antenna scaling by activating or deactivating at least one of the plurality of antenna elements of one or more antenna arrays of the wireless device.

As shown at 630, the method 600 may include determining whether the difference between beamforming gains obtained after the antenna scaling and before the antenna scaling exceeds a first threshold. According to some embodiments, the first threshold may be predetermined (e.g., hard coded in a specification) or configured by a base station (e.g., through an information element). If yes, the method 600 may proceed to 640; otherwise, the method 600 may return to the beginning and wait for the next antenna scaling, for example.

As shown at 640, the method 600 may include determining whether the difference between beamforming gains obtained after the antenna scaling and before the antenna scaling exceeds a second threshold. According to some embodiments, the second threshold is a phr-Tx-PowerFactorChange parameter. In some embodiments, the first threshold is smaller than the second threshold. If the difference between beamforming gains obtained after the antenna scaling and before the antenna scaling exceeds the second threshold, the method 600 may proceed to 650 where a PHR report may be generated. Then at 660, the PHR report may be sent to a base station in communication with the wireless device.

If it is determined that the difference between beamforming gains obtained after the antenna scaling and before the antenna scaling does not exceed the second threshold at 640, the method 600 may return to the beginning and wait for the next antenna scaling, for example.

According to some embodiments, the method 600 may further comprise receiving a message indicating whether enhanced PHR reporting is enabled from the base station. Such message may be received at any time, e.g., before step 620 or between steps 640 and 650. The PHR report may be generated at 650 further in response to the message indicating that the enhanced PHR reporting is enabled.

Figure 7:
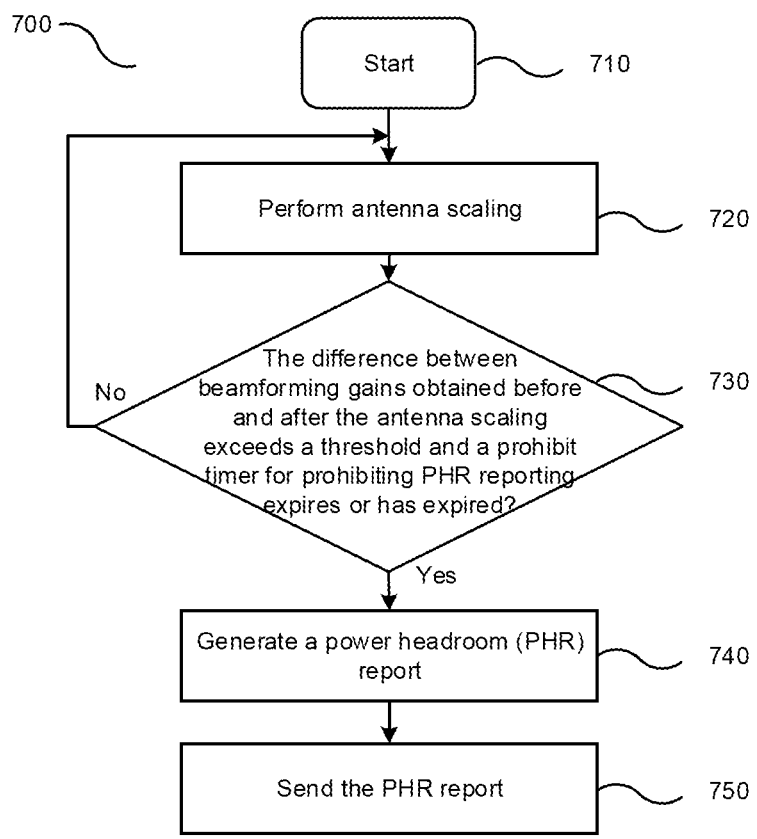

FIG. 7 is a flowchart diagram illustrating an example method 700 for enhanced PHR reporting in support of UE antenna scaling, according to some embodiments disclosed herein. The example method 700 may be implemented, for example, by a wireless device, such as the wireless device 202 in FIG. 2 or the UE 102 and UE 104 in FIG. 1. In various embodiments, some of the elements of the methods shown may be performed concurrently, in a different order than shown, may be substituted for by other method elements, or may be omitted. Additional elements may also be performed as desired. As shown, the method of FIG. 7 may operate as follows.

The method 700 may start at 710.

As shown at 720, the method 700 may include performing antenna scaling by activating or deactivating at least one of the plurality of antenna elements of one or more antennas of the wireless device.

As shown at 730, the method 700 may include determining whether the difference between beamforming gains obtained after the antenna scaling and before the antenna scaling exceeds a threshold and a prohibit timer for prohibiting PHR reporting (e.g., phr-ProhibitTimer) expires or has expired. For example, the threshold may include a phr-TxPowerFactorChange parameter as discussed above. If yes, the method 700 may proceed to 740, where a PHR report may be generated; otherwise, the method 500 may return to the beginning and wait for the next antenna scaling, for example. At 750, the PHR report may be sent to a base station in communication with the wireless device.

According to some embodiments, the method 700 may further comprise receiving a message indicating whether enhanced PHR reporting is enabled from the base station. Such message may be received at any time, e.g., before step 720 or between steps 720 and 730. The PHR report may be generated at 740 further in response to the message indicating that the enhanced PHR reporting is enabled.

Embodiments contemplated herein include an apparatus comprising means to perform one or more elements of the method 300, 500, 600 or 700. This apparatus may be, for example, an apparatus of a UE (such as a wireless device 202 that is a UE, as described herein).

Embodiments contemplated herein include one or more non-transitory computer-readable media comprising instructions to cause an electronic device, upon execution of the instructions by one or more processors of the electronic device, to perform one or more elements of the method 300, 500, 600 or 700. This non-transitory computer-readable media may be, for example, a memory of a UE (such as a memory 206 of a wireless device 202 that is a UE, as described herein).

Embodiments contemplated herein include an apparatus comprising logic, modules, or circuitry to perform one or more elements of the method 300, 500, 600 or 700. This apparatus may be, for example, an apparatus of a UE (such as a wireless device 202 that is a UE, as described herein).

Embodiments contemplated herein include an apparatus comprising: one or more processors and one or more computer-readable media comprising instructions that, when executed by the one or more processors, cause the one or more processors to perform one or more elements of the method 300, 500, 600 or 700. This apparatus may be, for example, an apparatus of a UE (such as a wireless device 202 that is a UE, as described herein).

Embodiments contemplated herein include a signal as described in or related to one or more elements of the method 300, 500, 600 or 700.

Embodiments contemplated herein include a computer program or computer program product comprising instructions, wherein execution of the program by a processor is to cause the processor to carry out one or more elements of the method 300, 500, 600 or 700. The processor may be a processor of a UE (such as a processor(s) 204 of a wireless device 202 that is a UE, as described herein). These instructions may be, for example, located in the processor and/or on a memory of the UE (such as a memory 206 of a wireless device 202 that is a UE, as described herein).

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. A wireless device, comprising:
    at least one antenna array, wherein each of the at least one antenna array comprises a plurality of antenna elements;
    at least one radio coupled to the at least one antenna element; and
    one or more processors coupled to the at least one radio;
    wherein the wireless device is configured to:
        perform antenna scaling by activating or deactivating at least one of the plurality of antenna elements of one or more antenna arrays of the at least one antenna array;
        generate a power headroom (PHR) report based at least on a difference between beamforming gains obtained after the antenna scaling and before the antenna scaling; and
        send the PHR report to a base station in communication with the wireless device.

2. The wireless device of claim 1, wherein the wireless device is further configured to:
    determine whether a triggering condition of PHR reporting is met, and
    wherein the PHR report is generated in response to determining that the triggering condition of PHR reporting is met.

3. The wireless device of claim 2, wherein, to determine whether the triggering condition of PHR reporting is met, the wireless device is further configured to:
    determine whether the difference between beamforming gains obtained after the antenna scaling and before the antenna scaling exceeds a threshold.

4. The wireless device of claim 2, wherein, to determine whether the triggering condition of PHR reporting is met, the wireless device is further configured to:
    determine whether the difference between beamforming gains obtained after the antenna scaling and before the antenna scaling exceeds a first threshold; and
    determine whether the difference between beamforming gains obtained after the antenna scaling and before the antenna scaling exceeds a second threshold, in response to determining that the difference between beamforming gains obtained after the antenna scaling and before the antenna scaling exceeds the first threshold.

5. The wireless device of claim 4, wherein the first threshold is predetermined or configured by the base station through signaling.

6. The wireless device of claim 4, wherein the second threshold is a phr-Tx-PowerFactorChange parameter.

7. The wireless device of claim 1, wherein the wireless device is further configured to:
    receive a message indicating whether enhanced PHR reporting is enabled from the base station, and
    wherein the PHR report is generated, when the message indicates that the enhanced PHR reporting is enabled.

8. The wireless device of claim 1, wherein the PHR report comprises a PHR value that is generated by taking measured path loss subtracted by the difference between beamforming gains obtained after the antenna scaling and before the antenna scaling as current path loss.

9. An apparatus, comprising:
    a processer configured to cause a wireless device, which comprises at least one antenna array each comprising a plurality of antenna elements, to:
    perform antenna scaling by activating or deactivating at least one of the plurality of antenna elements of one or more antenna arrays of the at least one antenna array;
    generate a power headroom (PHR) report based at least on a difference between beamforming gains obtained after the antenna scaling and before the antenna scaling; and
    send the PHR report to a base station in communication with the wireless device.

10. The apparatus of claim 9, wherein the processor is further configured to cause the wireless device to:
    determine whether a triggering condition of PHR reporting is met, and
    wherein the PHR report is generated in response to determining that the triggering condition of PHR reporting is met.

11. The apparatus of claim 10, wherein, to determine whether the triggering condition of PHR reporting is met, the processor is further configured to cause the wireless device to:
    determine whether the difference between beamforming gains obtained after the antenna scaling and before the antenna scaling exceeds a threshold.

12. The apparatus of claim 10, wherein, to determine whether the triggering condition of PHR reporting is met, the processor is further configured to cause the wireless device to:
    determine whether the difference between beamforming gains obtained after the antenna scaling and before the antenna scaling exceeds a first threshold; and
    determine whether the difference between beamforming gains obtained after the antenna scaling and before the antenna scaling exceeds a second threshold, in response to determining that the difference between beamforming gains obtained after the antenna scaling and before the antenna scaling exceeds the first threshold.

13. The apparatus of claim 12, wherein the first threshold is predetermined or configured by the base station through signaling.

14. The apparatus of claim 13, wherein the second threshold is a phr-Tx-PowerFactorChange parameter.

15. The apparatus of claim 9, wherein the processor is further configured to cause the wireless device to:
    receive a message indicating whether enhanced PHR reporting is enabled from the base station, and
    wherein the PHR report is generated, when the message indicates that the enhanced PHR reporting is enabled.

16. The apparatus of claim 9, wherein the PHR report comprises a PHR value that is generated by taking measured path loss subtracted by the difference between beamforming gains obtained after the antenna scaling and before the antenna scaling as current path loss.

17. A method, comprising:
by a wireless device, which comprises at least one antenna array each comprising a plurality of antenna elements:
performing antenna scaling by activating or deactivating at least one of the plurality of antenna elements of one or more antenna arrays of the at least one antenna array;
generating a power headroom (PHR) report based at least on a difference between beamforming gains obtained after the antenna scaling and before the antenna scaling; and
sending the PHR report to a base station in communication with the wireless device.

18. The method of claim 17, further comprising:
determining whether a triggering condition of PHR reporting is met, and
wherein the PHR report is generated in response to determining that the triggering condition of PHR reporting is met.

19. The method of claim 18, wherein determining whether the triggering condition of PHR reporting is met further comprises:
determining whether the difference between beamforming gains obtained after the antenna scaling and before the antenna scaling exceeds a threshold.

20. The method of claim 18, wherein determining whether the triggering condition of PHR reporting is met further comprises:
determining whether the difference between beamforming gains obtained after the antenna scaling and before the antenna scaling exceeds a first threshold; and
determining whether the difference between beamforming gains obtained after the antenna scaling and before the antenna scaling exceeds a second threshold, in response to determining that the difference between beamforming gains obtained after the antenna scaling and before the antenna scaling exceeds the first threshold.

* * * * *